(12) United States Patent
Chen

(10) Patent No.: US 11,474,410 B2
(45) Date of Patent: Oct. 18, 2022

(54) TUNABLE ILLUMINATOR

(71) Applicant: LIQXTAL TECHNOLOGY INC., Tainan (TW)

(72) Inventor: Hung-Shan Chen, Tainan (TW)

(73) Assignee: LIQXTAL TECHNOLOGY INC., Tainan (TW)

( * ) Notice: Subject to any disclaimer, the term of this patent is extended or adjusted under 35 U.S.C. 154(b) by 35 days.

(21) Appl. No.: 17/110,302

(22) Filed: Dec. 3, 2020

(65) Prior Publication Data

US 2022/0179280 A1    Jun. 9, 2022

(51) Int. Cl.
*G02F 1/31* (2006.01)
*G02F 1/1347* (2006.01)
*G01S 7/481* (2006.01)

(52) U.S. Cl.
CPC .............. *G02F 1/31* (2013.01); *G02F 1/1347* (2013.01); *G02F 1/13471* (2013.01); *G01S 7/4814* (2013.01)

(58) Field of Classification Search
CPC ...... G02F 1/31; G02F 1/1347; G02F 1/13471; G01S 7/4814; G02B 27/425; G01N 21/23
See application file for complete search history.

(56) References Cited

U.S. PATENT DOCUMENTS

| | | | |
|---|---|---|---|
| 2019/0101381 A1* | 4/2019 | Chen | G01B 11/254 |
| 2019/0162981 A1* | 5/2019 | Chen | G02B 27/425 |
| 2019/0373186 A1* | 12/2019 | Ortiz Egea | H04N 5/332 |
| 2020/0132277 A1* | 4/2020 | Akkaya | F21V 14/003 |
| 2020/0228764 A1* | 7/2020 | Chen | G02F 1/133 |

FOREIGN PATENT DOCUMENTS

| | | |
|---|---|---|
| TW | I683156 | 1/2020 |
| TW | 202030456 | 8/2020 |

OTHER PUBLICATIONS

Office Action of Taiwan Counterpart Application, dated Oct. 15, 2021, pp. 1-7.

* cited by examiner

*Primary Examiner* — Jessica M Merlin
(74) *Attorney, Agent, or Firm* — JCIPRNET

(57) ABSTRACT

A tunable illuminator includes a light source, at least one geometric phase liquid crystal element, and a driver. The light source is configured to emit an illumination beam. The geometric phase liquid crystal element is disposed on a path of the illumination beam and configured to be switched between a first state and a second state, wherein the first state is closer to a geometric phase than the second state is. The driver is configured to respectively apply a first voltage difference and a second voltage difference to the geometric phase liquid crystal element, wherein the geometric phase liquid crystal element is switched to the first state in response to the first voltage difference, the geometric phase liquid crystal element is switched to the second state in response to the second voltage difference, and the first voltage difference is less than the second voltage difference.

14 Claims, 17 Drawing Sheets

TUNABLE ILLUMINATOR

BACKGROUND OF THE INVENTION

1. Field of the Invention

The invention generally relates to a light source and, in particular, to a tunable illuminator.

2. Description of Related Art

An illuminator can be adopted to emit an illumination beam to illuminate an object outside an electronic device. The object reflects at least a part of the illumination beam into a signal beam, and a light sensor of the electronic device can sense the signal beam to obtain a two-dimensional image, a three-dimensional image or three-dimensional position information of the object or a distance from the object.

A conventional illuminator has a fixed field of illumination (FOI). When the object is closer to the electronic device, the FOI may not be large enough to cover the whole of the object. When the object is more distant from the electronic device, the illuminance on the object may not be enough.

A conventional structured light illuminator emits a structured light having a constant resolution. When the resolution is high, the light energy is more dispersive, and illuminance of a light pattern on a distant object may not be enough. When the resolution is low, the more detailed information of an object closer to the electronic device may not be obtained.

SUMMARY OF THE INVENTION

Accordingly, the invention is directed to a tunable illuminator capable of tuning the FOI or resolution of an illumination beam.

According to an embodiment of the invention, a tunable illuminator including a light source, at least one geometric phase liquid crystal element, and a driver is provided. The light source is configured to emit an illumination beam. The geometric phase liquid crystal element is disposed on a path of the illumination beam and configured to be switched between a first state and a second state, wherein the first state is closer to a geometric phase than the second state is. The driver is configured to respectively apply a first voltage difference and a second voltage difference to the geometric phase liquid crystal element, wherein the geometric phase liquid crystal element is switched to the first state in response to the first voltage difference, the geometric phase liquid crystal element is switched to the second state in response to the second voltage difference, and the first voltage difference is less than the second voltage difference. The tunable illuminator satisfies FOI1>FOI2 or R1>R2, where FOI1 is a field of illumination of the illumination beam formed by the geometric phase liquid crystal element in the first state, FOI2 is a field of illumination of the illumination beam formed by the geometric phase liquid crystal element in the second state, R1 is a resolution of the illumination beam formed by the geometric phase liquid crystal element in the first state, and R2 is a resolution of the illumination beam formed by the geometric phase liquid crystal element in the second state.

In the tunable illuminator according to the embodiment of the invention, since a geometric phase liquid crystal element is disposed on a path of the illumination beam and configured to be switched between a first state and a second state, the field of illumination or the resolution of the illumination beam can be tuned.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
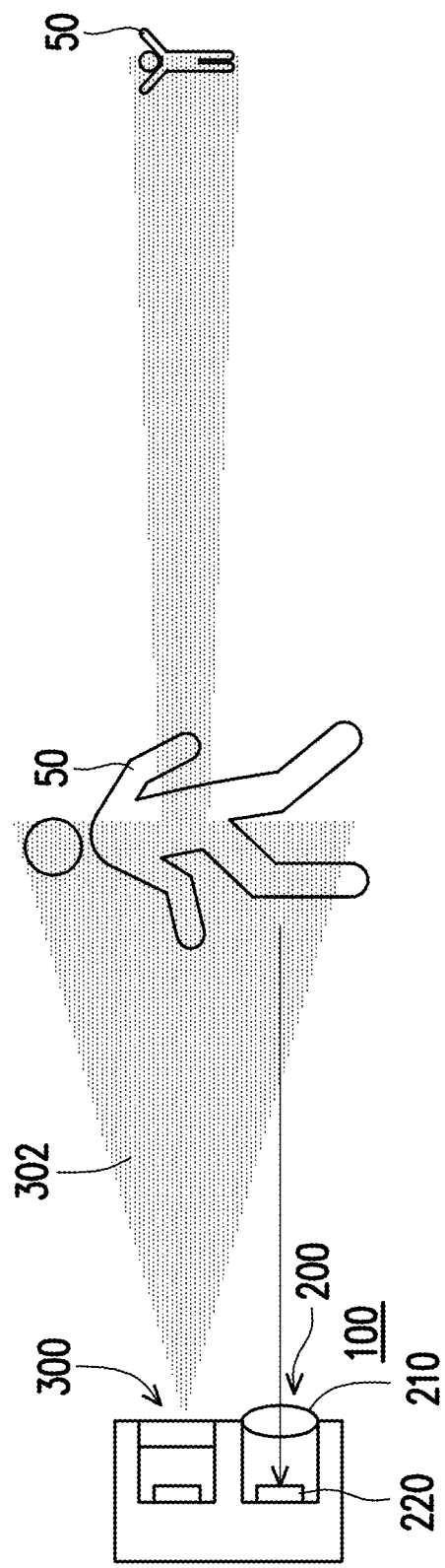
FIG. 1 is a schematic view of an optical sensing device according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic view of an optical sensing device according to an embodiment of the invention. Referring to FIG. 1, the optical sensing device 100 in this embodiment is a time-of-flight (ToF) sensor, a structured light sensor, a LiDAR sensor, or a floodlight camera. The optical sensing device 100 includes a light capturing module 200 and a tunable illuminator 300. The tunable illuminator 300 is configured to provide an illumination beam 302 to illuminate an object 50. The object 50 reflects the illumination beam 302 into a signal light 52. The light capturing module 200 may include a lens 210 and a light sensor array 220. The signal light 52 passes through the lens 210 and is then sensed by the light sensor array 220, so that the light sensor array 220 can obtain at least one of the image of the object 50 and a distance between the optical sensing device 100 and the object 50.

Figure 2A:
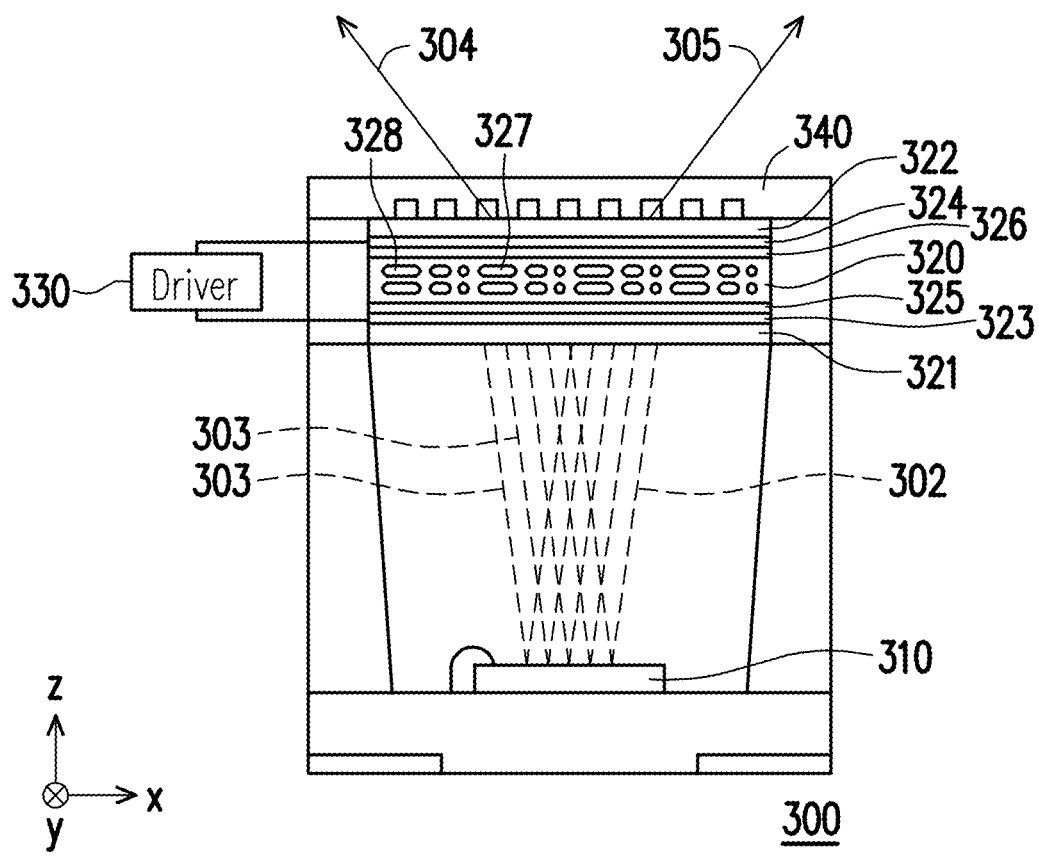
FIG. 2A and FIG. 2B are schematic cross-sectional views of the tunable illuminator in FIG. 1 in a first state and a second state, respectively, according to an embodiment of the invention.
Figure 2B:
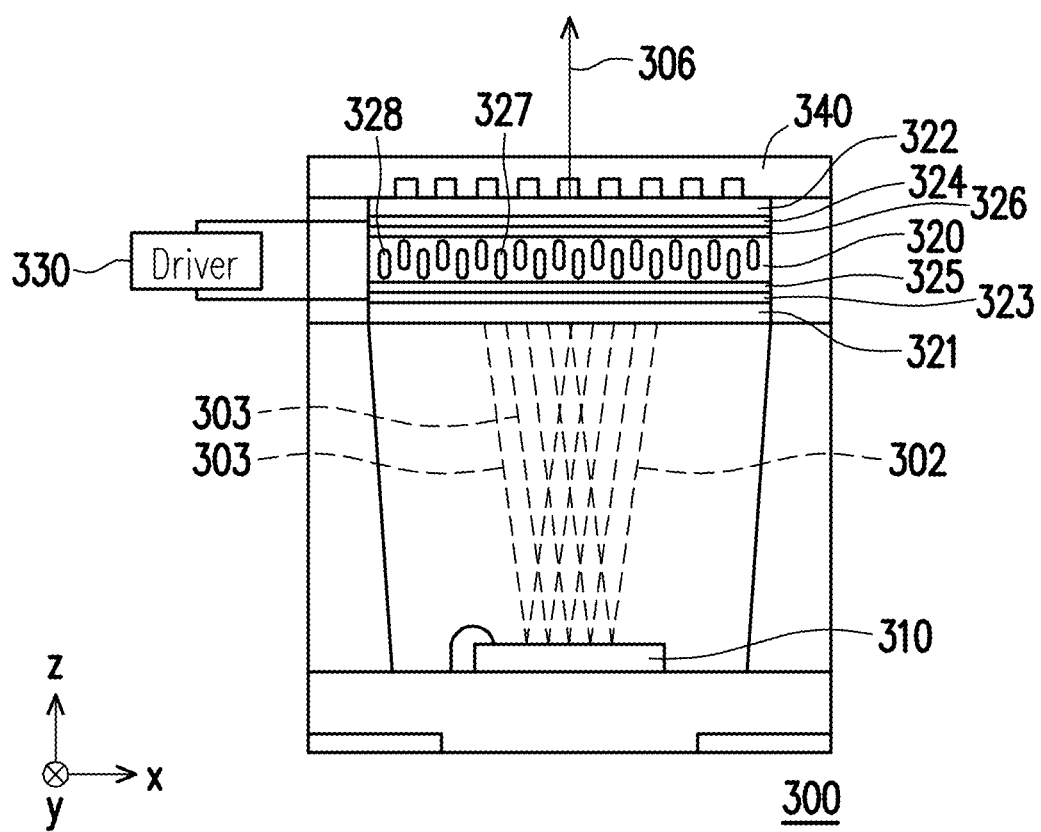

FIG. 2A and FIG. 2B are schematic cross-sectional views of the tunable illuminator in FIG. 1 in a first state and a second state, respectively, according to an embodiment of the invention. Referring to FIG. 2A and FIG. 2B, the tunable illuminator 300 includes a light source 310, at least one geometric phase liquid crystal element 320, and a driver 330. The light source 310 is configured to emit an illumination beam 302. In this embodiment, the light source 310 is a vertical cavity surface emitting laser (VCSEL), and the illumination beam 302 includes a plurality of illumination sub-beams 303.

The geometric phase liquid crystal element 320 is disposed on a path of the illumination beam 302 and configured to be switched between a first state (as shown in FIG. 2A) and a second state (as shown in FIG. 2B), wherein the first state is closer to a geometric phase than the second state is. The driver 330 is configured to respectively apply a first voltage difference and a second voltage difference to the geometric phase liquid crystal element 320. The geometric phase liquid crystal element 320 is switched to the first state in response to the first voltage difference, the geometric phase liquid crystal element 320 is switched to the second state in response to the second voltage difference, and the first voltage difference is less than the second voltage difference.

In this embodiment, the geometric phase liquid crystal element 320 includes a substrate 321, a substrate 322, an electrode layer 323, an electrode layer 324, an alignment layer 325, an alignment layer 326, and a liquid crystal layer 327. The electrode layer 323 is disposed on the substrate 321, and the alignment layer 325 is disposed on the electrode layer 323. The electrode layer 324 is disposed on the substrate 322, and the alignment layer 326 is disposed on the electrode layer 324. The liquid crystal layer 327 is disposed between the alignment layer 325 and the alignment layer 326.

Figure 3A:
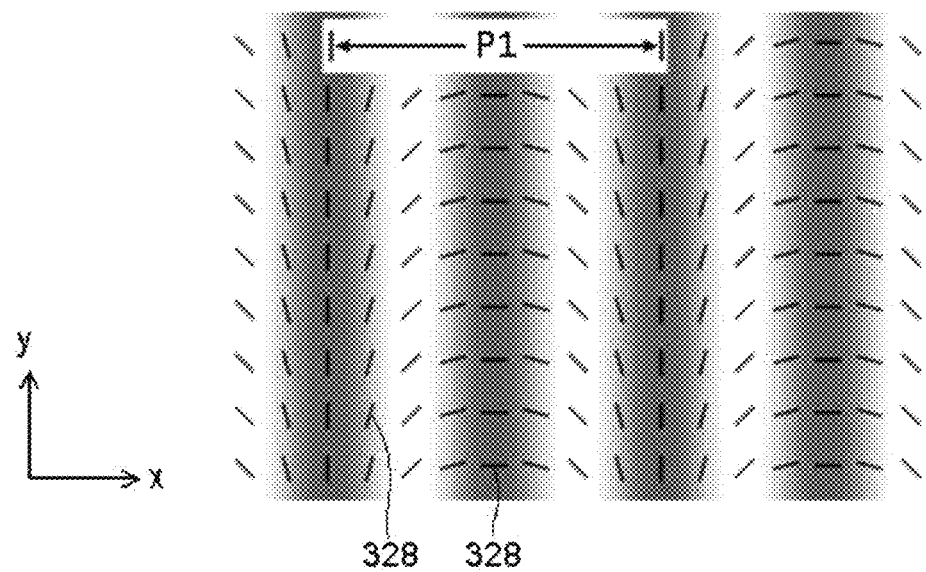
FIG. 3A shows the orientation distribution of liquid crystal molecules of the liquid crystal layer in FIG. 2A.
Figure 3B:
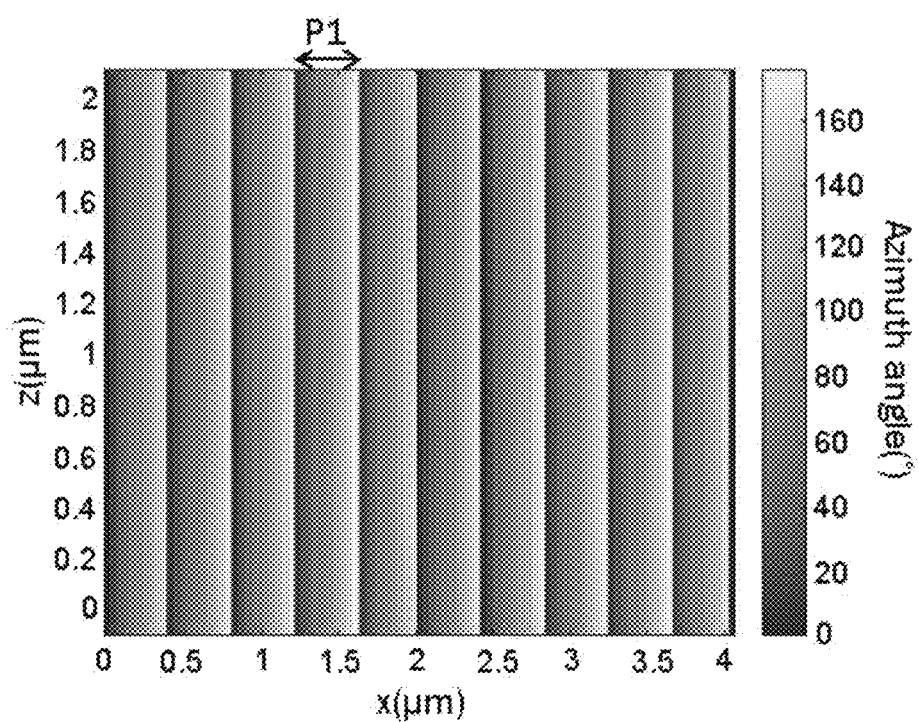
FIG. 3B shows the azimuth angle distribution of liquid crystal molecules of the liquid crystal layer in FIG. 2A.

FIG. 3A shows the orientation distribution of liquid crystal molecules of the liquid crystal layer in FIG. 2A, and FIG. 3B shows the azimuth angle distribution of liquid crystal molecules of the liquid crystal layer in FIG. 2A. Referring to FIG. 2A, FIG. 3A, and FIG. 3B, in this embodiment, the first voltage difference applied between the electrode layer 323 and the electrode layer 324 by the driver 330 is zero, and the liquid crystal layer 327 in the first state has the geometric phase, i.e. the Pancharatnam-Berry phase, as shown in FIG. 3A and FIG. 3B. FIG. 3A and FIG. 3B shows that the orientations of liquid crystal molecules 328 of the liquid crystal layer 327 rotates as the x coordinate increases, and the orientations of liquid crystal molecules 328 at the same x coordinate, different y coordinates, and different z coordinates are the same. Therefore, the liquid crystal layer 327 may form a one-dimensional grating or a one-dimensional prism sheet having a pitch P1; that is, the geometric phase liquid crystal element is a one-dimensional grating or a one-dimensional prism sheet. The z direction is the thickness direction of the liquid crystal layer 327, and the x direction, the y direction, and the z direction are perpendicular to each other.

When the geometric phase liquid crystal element 320 is in the first state, as shown in FIG. 2A, FIG. 3A, and FIG. 3B, the liquid crystal molecules 328 of the liquid crystal layer 327 lie horizontally on the alignment layer 325 and the alignment layer 326, which align the liquid crystal layer 327 to form the geometric phase. When the second voltage difference which is not zero is applied between the electrode layer 323 and the electrode layer 324 by the driver 330, the liquid crystal molecules 328 stand vertically as shown in FIG. 2B.

In this embodiment, the geometric phase liquid crystal element 320 is a one-dimensional grating, and the geometric phase liquid crystal element 320 in the first state is configured to split the illumination beam 302 into a first positive order diffraction beam 304 and a first negative order diffraction beam 305. In this embodiment, the illumination beam 302 from the light source 310 is a randomly polarized beam, and the geometric phase liquid crystal element 320 in the first state diffracts the illumination beam 302 into the first positive order diffraction beam 304 and the first negative order diffraction beam 305. One of the first positive order diffraction beam 304 and the first negative order diffraction beam 305 is a left-handed circularly polarized beam, and the other of the first positive order diffraction beam 304 and the first negative order diffraction beam 305 is a right-handed circularly polarized beam.

Besides, the geometric phase liquid crystal element 320 in the second state is configured to allow the illumination beam 302 to pass through to form a zero order diffraction beam 306.

In this embodiment, the tunable illuminator 300 satisfies FOI1>FOI2, wherein FOI1 is a field of illumination of the illumination beam 302 formed by the geometric phase liquid crystal element 320 in the first state, and FOI2 is a field of illumination of the illumination beam 302 formed by the geometric phase liquid crystal element 320 in the second state. Therefore, when the optical sensing device 100 senses the object 50 closer thereto, the driver 330 may switch the geometric phase liquid crystal element 320 to the first state, so that the illumination beam 302 may have a larger field of illumination to cover the object 50, and the light capturing module 200 may have a larger field of view to cover the object 50. On the other hand, when the optical sensing device 100 senses the object 50 more distant from the optical sensing device 100, the driver 330 may switch the geometric phase liquid crystal element 320 to the second state, so that the illumination beam may have a smaller field of illumination to concentrate light energy on the distant object 50 to provide enough illuminance to the object 50, and the light capturing module 200 may have a smaller field of view to sense the distant object 50.

In this embodiment, the tunable illuminator 300 further includes a diffractive optical element 340 disposed on the path of the illumination beam 302 and configured to let the illumination beam 302 be a structured beam. In this embodiment, the geometric phase liquid crystal element 320 is disposed between the light source 310 and the diffractive optical element 340. However, in other embodiments, the diffractive optical element 340 may be disposed between the light source 310 and the geometric phase liquid crystal element 320.

Figure 4:
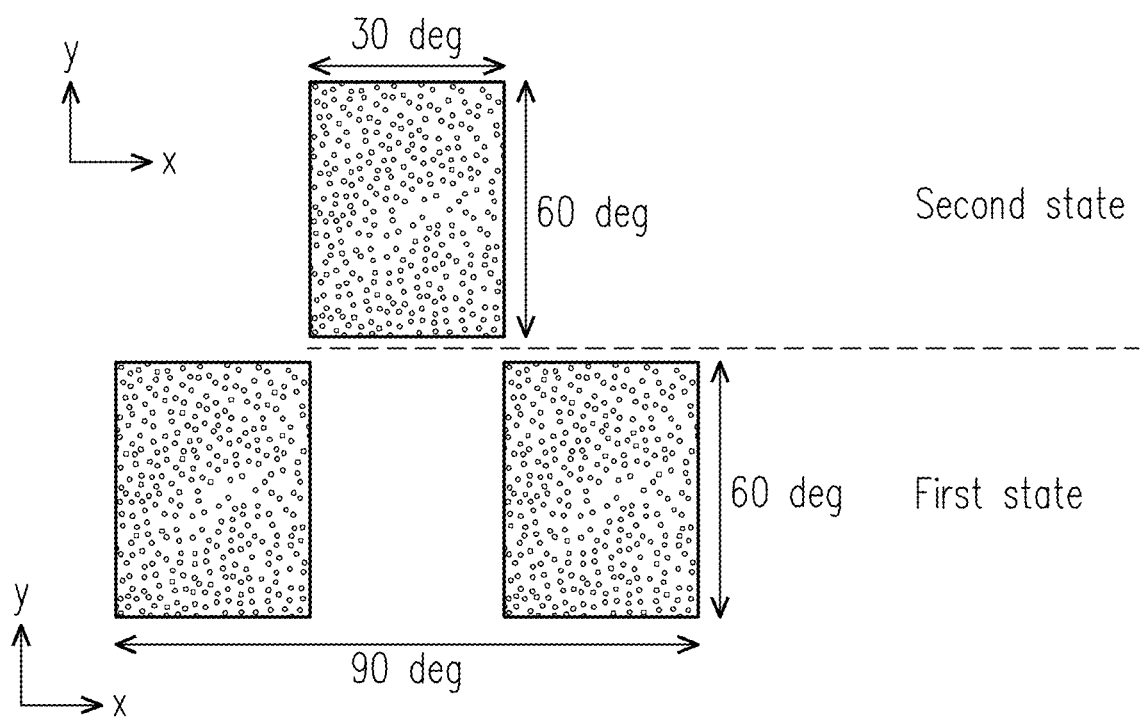
FIG. 4 shows light patterns provided by the tunable illuminator in FIG. 1 when the geometric phase liquid crystal element is in the second state and the first state, respectively, according to an embodiment of the invention.

FIG. 4 shows light patterns provided by the tunable illuminator in FIG. 1 when the geometric phase liquid crystal element is in the second state and the first state, respectively, according to an embodiment of the invention. Referring to FIG. 2A, FIG. 2B, and FIG. 4, when the geometric phase liquid crystal element 320 is in the second state, the tunable illuminator 300 has a smaller field of illumination being about 30 degrees in the x direction. When the geometric phase liquid crystal element 320 is in the first state, the tunable illuminator 300 has a larger field of illumination being about 90 degrees in the x direction, but has no light pattern at about ±15 degrees in the x direction around the normal direction of the geometric phase liquid crystal element 320. The driver 330 may drive the geometric phase liquid crystal element 320 to be in the second state and the first state alternately, so that the tunable illuminator 300 may provide a continuous field of illumination of about 90 degrees, so that the optical sensing device 100 in FIG. 1 can sense the object 50 closer thereto and have a enough field of illumination to cover the closer object 50.

Figure 5:
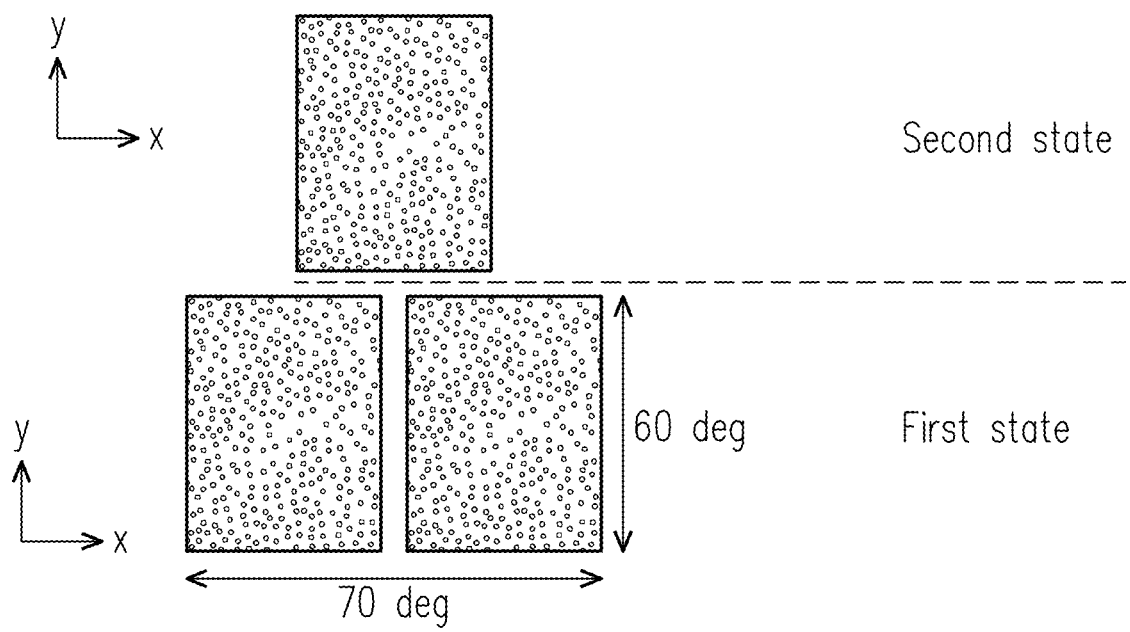
FIG. 5 shows light patterns provided by the tunable illuminator in FIG. 1 when the geometric phase liquid crystal element is in the second state and the first state, respectively, according to another embodiment of the invention.

FIG. 5 shows light patterns provided by the tunable illuminator in FIG. 1 when the geometric phase liquid crystal element is in the second state and the first state, respectively, according to another embodiment of the invention. Referring to FIG. 2A, FIG. 2B, and FIG. 5, the embodiment in FIG. 5 is similar to the embodiment in FIG. 4, and the main difference therebetween is as follows. In this embodiment, the field of illumination of the tunable illuminator 300 when the geometric phase liquid crystal element 320 is in the first state overlaps the field of illumination of the tunable illuminator 300 when the geometric phase liquid crystal element 320 is in the second state. However, in the embodiment of FIG. 4, the field of illumination of the tunable illuminator 300 when the geometric phase liquid crystal element 320 is in the first state does not overlap the field of illumination of the tunable illuminator 300 when the geometric phase liquid crystal element 320 is in the second state.

Figure 6:
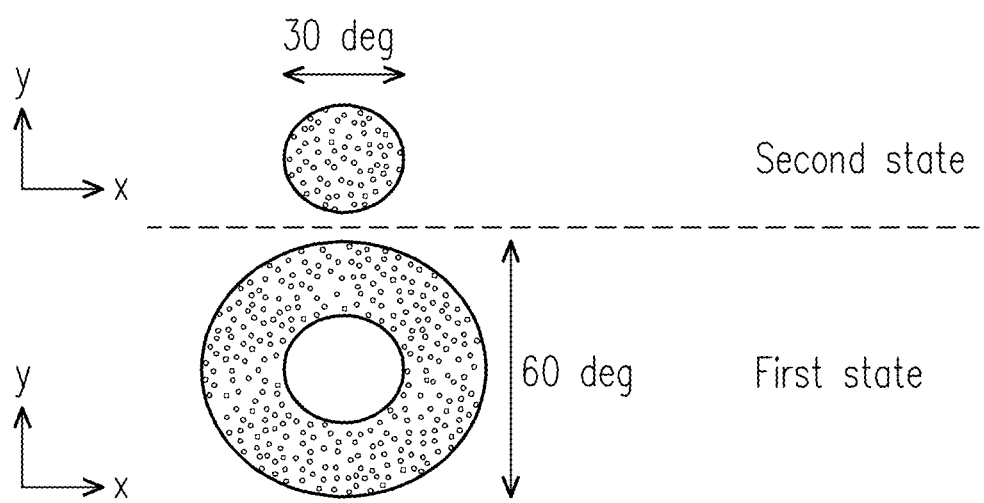
FIG. 6 shows light patterns provided by the tunable illuminator in FIG. 1 when the geometric phase liquid crystal element is in the second state and the first state, respectively, according to another embodiment of the invention.

FIG. 6 shows light patterns provided by the tunable illuminator in FIG. 1 when the geometric phase liquid crystal element is in the second state and the first state, respectively, according to another embodiment of the invention. Referring to FIG. 1, FIG. 2A, FIG. 2B, and FIG. 6, the tunable illuminator in this embodiment is similar to the tunable illuminator in the embodiment of FIG. 3A and FIG. 3B, and the main difference is that the geometric phase liquid crystal element 320 in this embodiment is a two-dimensional grating, and the periodical pitch P1 in the x direction in FIG. 3A may be changed to a periodical pitch in all radial directions in a plane parallel to the xy plane in this embodiment. As a result, the tunable illuminator in this embodiment when the geometric phase liquid crystal element 320 is in the first state provides a donut-shaped light pattern having a larger field of illumination in all radial directions in a plane parallel to the xy plane. Besides, the tunable illuminator in this embodiment when the geometric phase liquid crystal element 320 is in the second state provides a circular-shaped light pattern having a smaller field of illumination in all radial directions in a plane parallel to the xy plane.

Figure 7:
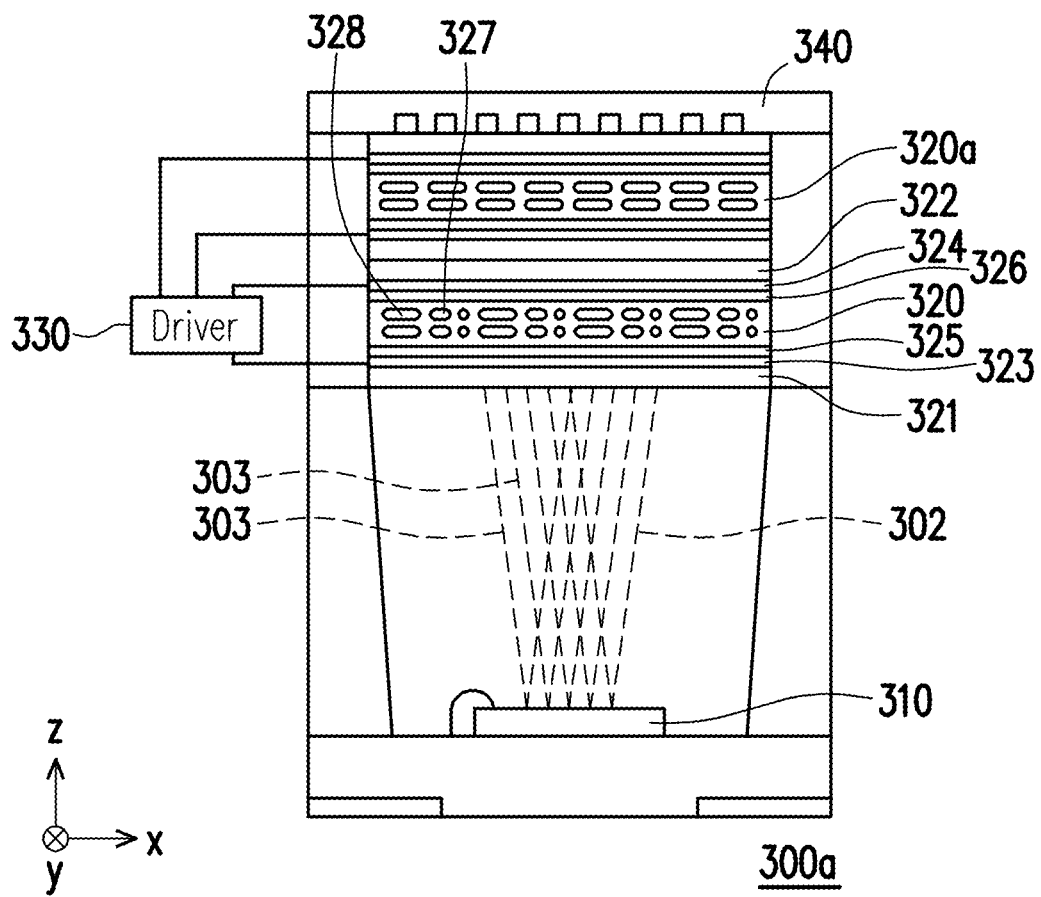
FIG. 7 is a schematic cross-sectional view of the tunable illuminator according to another embodiment of the invention.

FIG. 7 is a schematic cross-sectional view of the tunable illuminator according to another embodiment of the invention. Referring to FIG. 7, the tunable illuminator 300*a* in this embodiment is similar to the tunable illuminator 300 in FIG. 2A, and the main difference is as follows. In this embodiment, the tunable illuminator 300*a* includes two geometric phase liquid crystal elements 320 and 320*a* having different periodical directions and stacked on the path of the illumination beam 302. Specifically, the geometric phase liquid crystal element 320*a* is also a one-dimensional grating or prism as the geometric phase liquid crystal element 320. The periodical direction of the geometric phase liquid crystal element 320 is the x direction, but the periodical direction of the geometric phase liquid crystal element 320*a* is the y direction.

Figure 8:
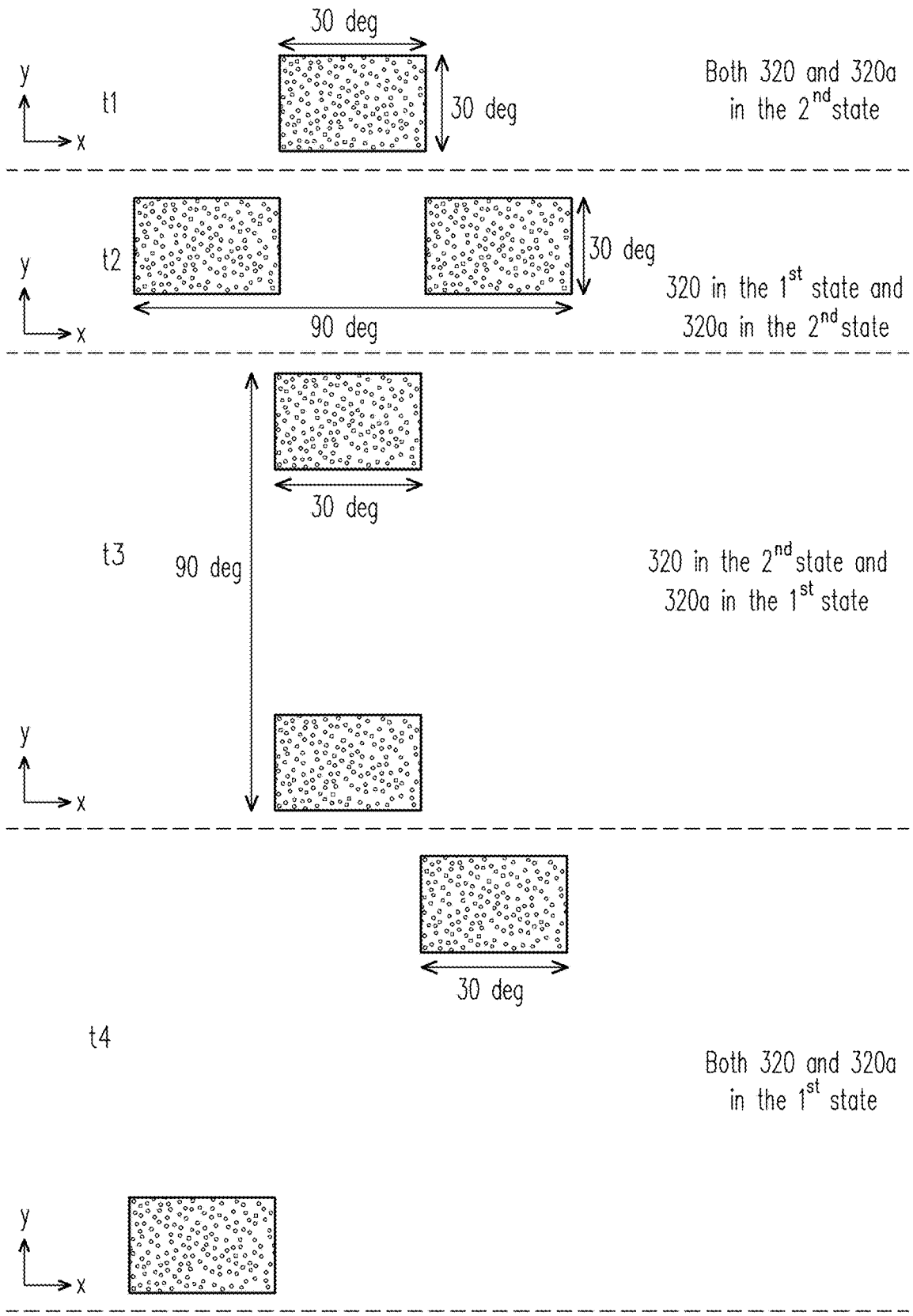
FIG. 8 shows light patterns provided by the tunable illuminator in FIG. 7 when the two geometric phase liquid crystal elements are respectively in the second and second states, the first and second states, the second and first states, and the first and first states.

FIG. 8 shows light patterns provided by the tunable illuminator in FIG. 7 when the two geometric phase liquid crystal elements are respectively in the second and second states, the first and second states, the second and first states, and the first and first states. Referring to FIG. 7 and FIG. 8, in a first time t1, the driver 330 drivers the geometric phase liquid crystal element 320 to be in the second state, and drivers the geometric phase liquid crystal element 320*a* to be in the second state, so that the light pattern provided by the tunable illuminator 300*a* has a smaller field of illumination in both the x direction and the y direction. In a second time t2, the driver 330 drivers the geometric phase liquid crystal element 320 to be in the first state, and drivers the geometric phase liquid crystal element 320*a* to be in the second state, so that the light pattern provided by the tunable illuminator 300*a* has a larger field of illumination in the x direction and a smaller field of illumination in the y direction. In a third time t3, the driver 330 drivers the geometric phase liquid crystal element 320 to be in the second state, and drivers the geometric phase liquid crystal element 320*a* to be in the first state, so that the light pattern provided by the tunable illuminator 300*a* has a smaller field of illumination in the x direction and a larger field of illumination in the y direction. In a fourth time t4, the driver 330 drivers the geometric phase liquid crystal element 320 to be in the first state, and drivers the geometric phase liquid crystal element 320*a* to be in the first state, so that the light pattern provided by the tunable illuminator 300*a* has a larger field of illumination in a diagonal direction.

Figure 9:
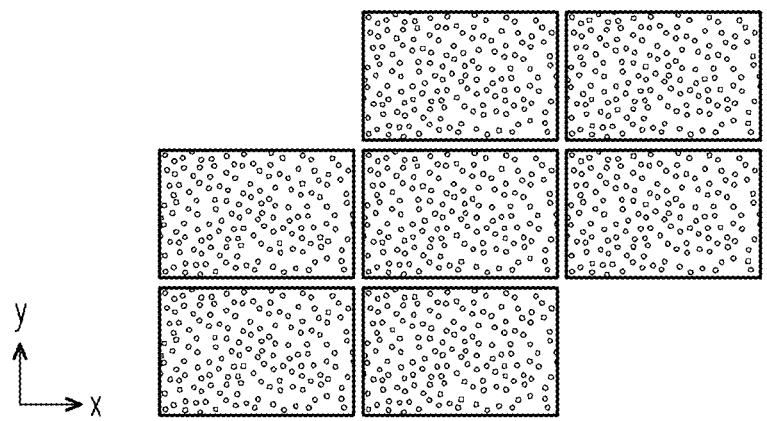
FIG. 9 shows the combination of the light patterns in the first, second, third, and fourth times in FIG. 8.

FIG. 9 shows the combination of the light patterns in the first, second, third, and fourth times in FIG. 8. Referring to FIG. 7 to FIG. 9, when the driver 330 switches the geometric phase liquid crystal element 320 and the geometric phase liquid crystal element 320*a* to the states in the first, second, third, and fourth times rapidly, the tunable illuminator 300*a* may be regarded as being capable of providing a light pattern having larger field of illumination in both the x direction and the y direction, as the combination of the light patterns shown in FIG. 9.

Figure 10:
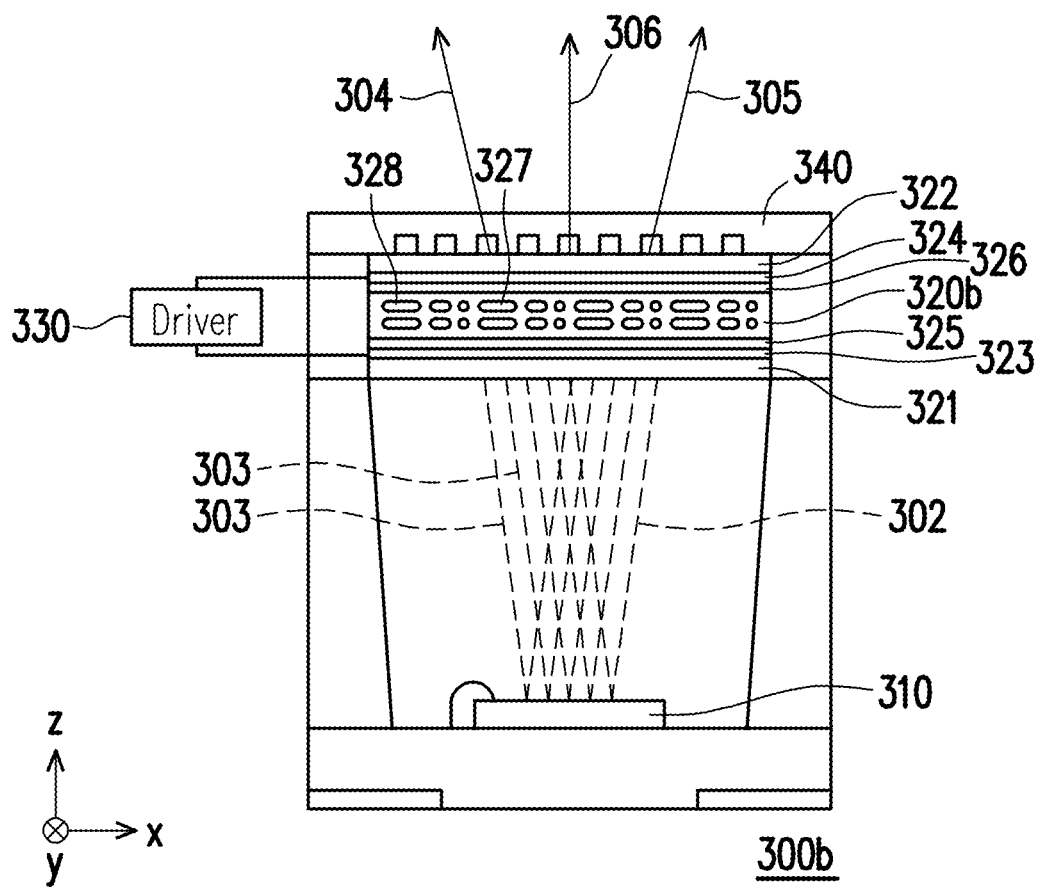
FIG. 10 is a tunable illuminator when the geometric phase liquid crystal element is in the first state according to another embodiment of the invention.
Figure 11A:
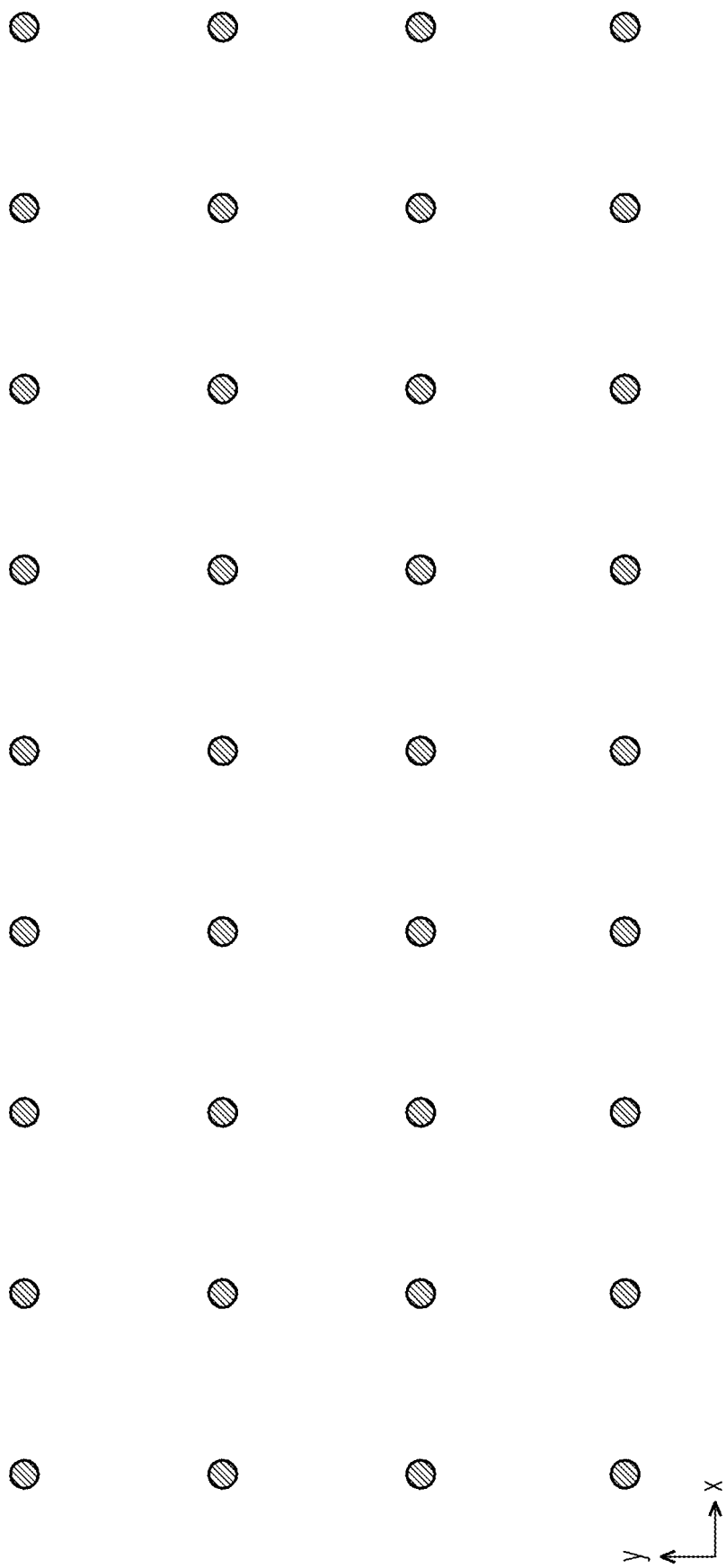
FIG. 11A is a light pattern provided by the tunable illuminator in FIG. 10 in the second state.
Figure 11B:
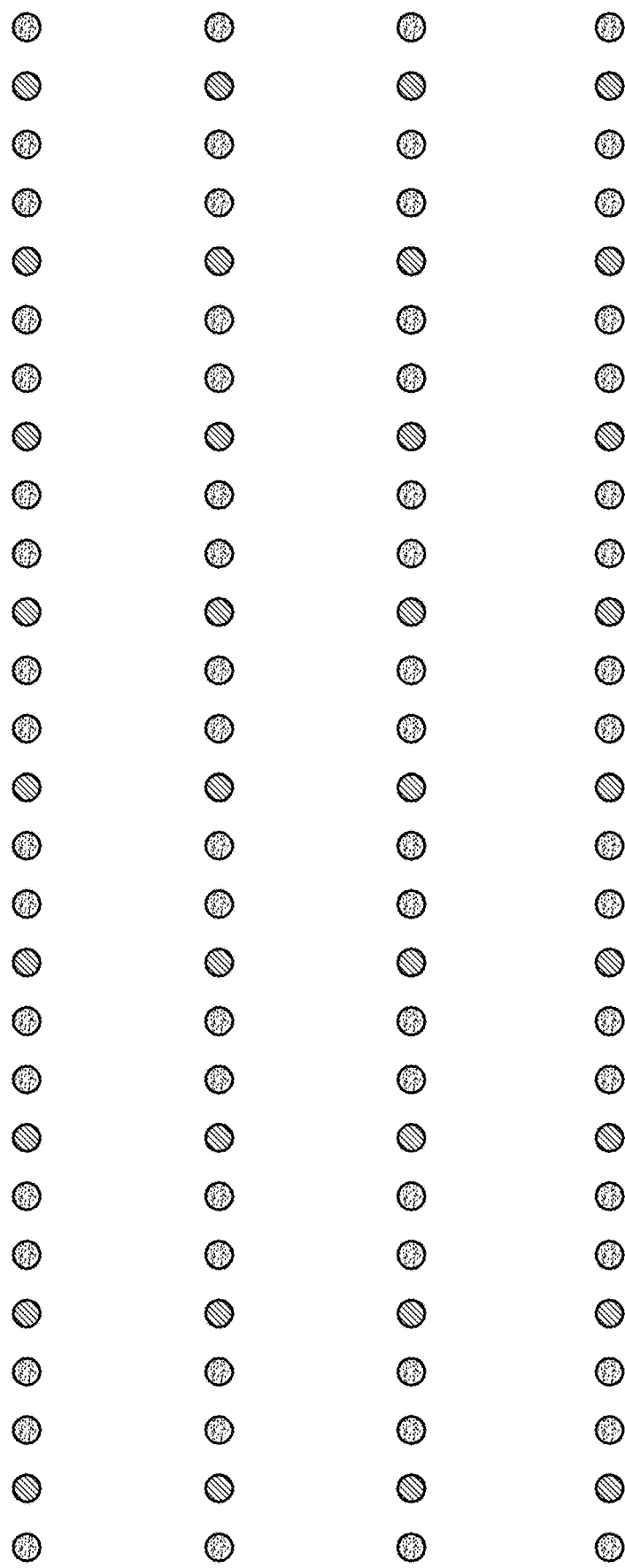
FIG. 11B is a light pattern provided by the tunable illuminator in FIG. 10 in the first state.

FIG. 10 is a tunable illuminator when the geometric phase liquid crystal element is in the first state according to another embodiment of the invention. FIG. 11A is a light pattern provided by the tunable illuminator in FIG. 10 in the second state, and FIG. 11B is a light pattern provided by the tunable illuminator in FIG. 10 in the first state. Referring to FIG. 10, FIG. 11A, and FIG. 11B, the tunable illuminator 300b is similar to the tunable illuminator 300 in FIG. 2A, and the main difference therebetween is as follows. In the tunable illuminator 300b, the geometric phase liquid crystal element 320b in the first state is configured to split a part of the illumination beam 302 into a first positive order diffraction beam 304 and a first negative order diffraction beam 305, and allow another part of the illumination beam 302 to pass through to form a zero order diffraction beam 306. The tunable illuminator 300b when the geometric phase liquid crystal element 320b in the second state is similar to the tunable illuminator 300 in FIG. 2B, and the geometric phase liquid crystal element 320b in the second state is configured to allow the illumination beam 302 to pass through to form a zero order diffraction beam 306.

In the embodiment of FIG. 2A, the Δnd is λ/2, where Δn is the birefringence of the liquid crystal layer 327, d is the thickness of the liquid crystal layer 327, and λ is the wavelength of the illumination beam 302. However, in this embodiment (see FIG. 10), Δnd is less than λ/2; for example, Δnd is about 0.3018λ. As a result, the diffraction efficiencies of the zero order diffraction beam 306, the first positive order diffraction beam 304, and the first negative order diffraction beam 305 are 34%, 33%, and 33%, respectively. The Δnd can be determined by a suitable liquid crystal material to determine Δn, and by a suitable thickness of the liquid crystal layer 327 to determine d. Alternatively, in other embodiments, the liquid crystal alignment arrangement of the liquid crystal layer 327 may be designed to have a lower diffraction efficiency, so that the geometric phase liquid crystal element 320b in the first state can convert the illumination beam 302 into the zero order diffraction beam 306, the first positive order diffraction beam 304, and the first negative order diffraction beam 305.

Moreover, the periodical pitch P1 of the geometric phase liquid crystal element 320 in FIG. 2A is less than the periodical pitch of the geometric phase liquid crystal 320b, so that the diffractive angle of the first positive order diffraction beam 304 and the first negative order diffraction beam 305 in FIG. 2A is greater than the diffractive angle of the first positive order diffraction beam 304 and the first negative order diffraction beam 305 in FIG. 10. Therefore, the geometric phase liquid crystal element 320 in the first state in FIG. 2A enlarges the field of illumination of the illumination beam 302, but the geometric phase liquid crystal element 320b in the first state in FIG. 10 increases the resolution of the illumination beam 302.

Specifically, the tunable illuminator 300b satisfies R1>R2, where R1 is the resolution of the illumination beam 302 formed by the geometric phase liquid crystal element 320b in the first state, and R2 is the resolution of the illumination beam 302 formed by the geometric phase liquid crystal element 320b in the second state.

As shown in FIG. 11A, when the geometric phase liquid crystal element 320b is in the second state, the tunable illuminator 300b provides the zero order diffraction beam 306, which is a structured beam and can form a plurality of light dots on the object 50. As shown in FIG. 11B, when the geometric phase liquid crystal element 320b is in the first state, the tunable illuminator 300b provides the zero order diffraction beam 306, the first positive order diffraction beam 304, and the first negative order diffraction beam 305. The first positive order diffraction beam 304 and the first negative order diffraction beam 305 have small diffractive angles, so that the first positive order diffraction beam 304 and the first negative order diffraction beam 305 respectively form two light dots between every two adjacent light dots formed by the zero order diffraction beam 306. Therefore, the geometric phase liquid crystal element 320b in the first state triples the resolution of the illumination beam 302, and the optical sensing device adopting the tunable illuminator 300b can obtain more detail information of the closer object 50. Besides, the geometric phase liquid crystal element 320b in the second state concentrates the light energy on the zero order diffraction beam 306 and less light dots, so that the zero order diffraction beam 306 is suitable for illuminating the more distant object 50, and the optical sensing device adopting the tunable illuminator 300b can sense the more distant object 50.

Figure 12:
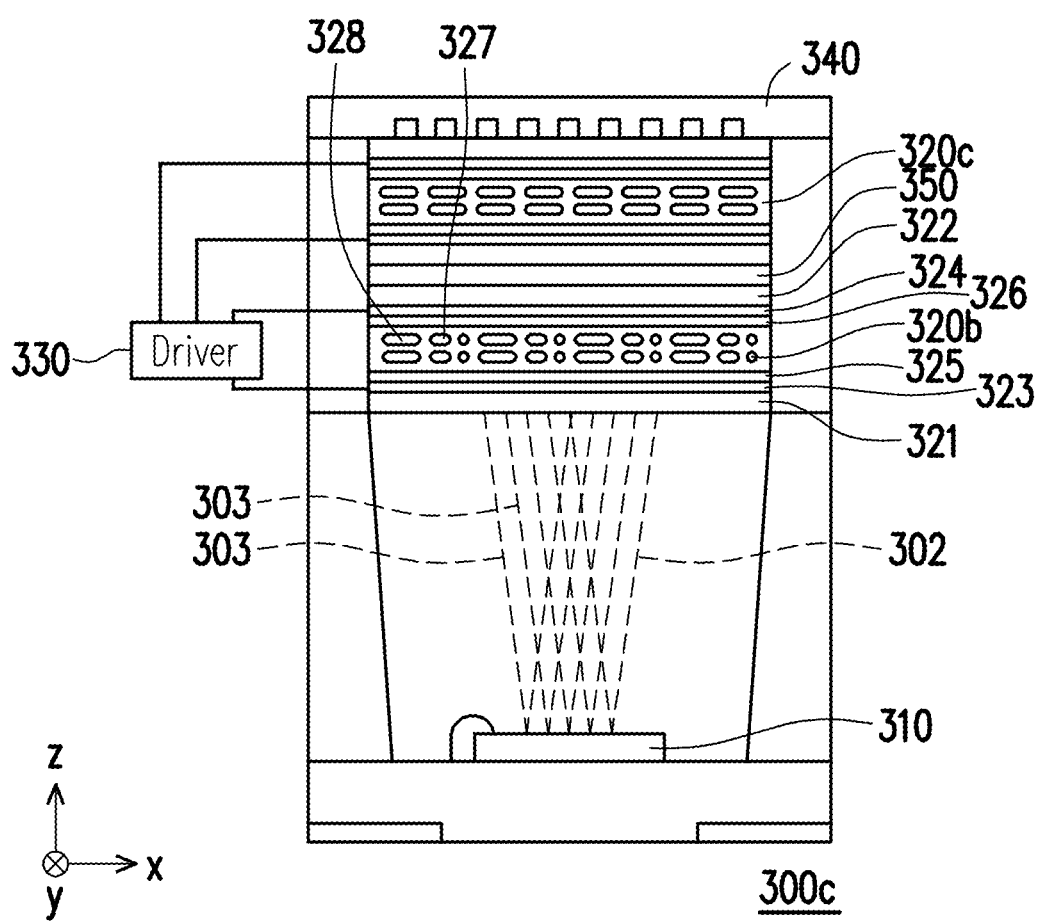
FIG. 12 is a tunable illuminator when two geometric phase liquid crystal elements are in the first and first states, respectively, according to another embodiment of the invention.
Figure 13A:
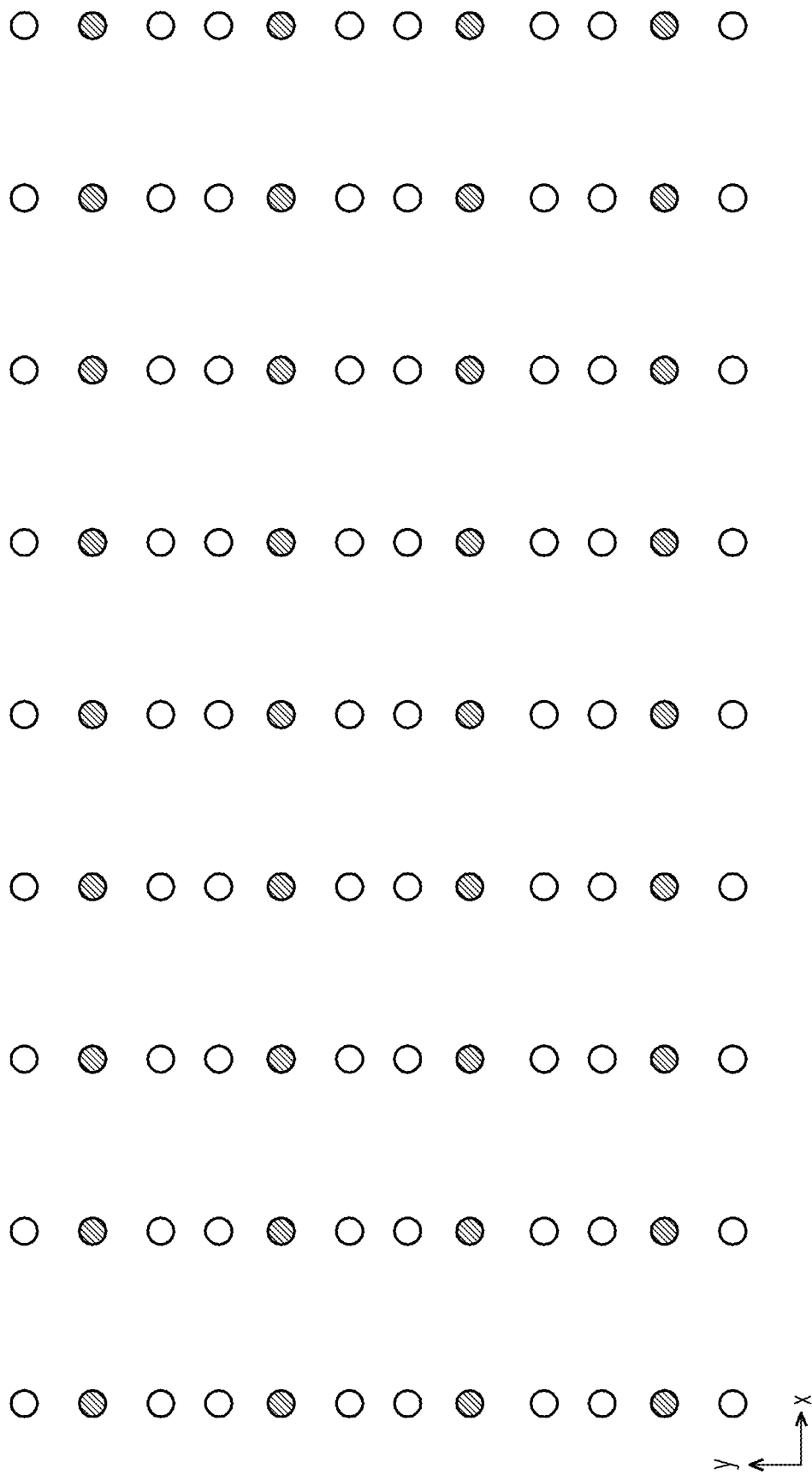
FIG. 13A is a light pattern provided by the tunable illuminator in FIG. 12 when the two geometric phase liquid crystal elements are in the second and first states, respectively.
Figure 13B:
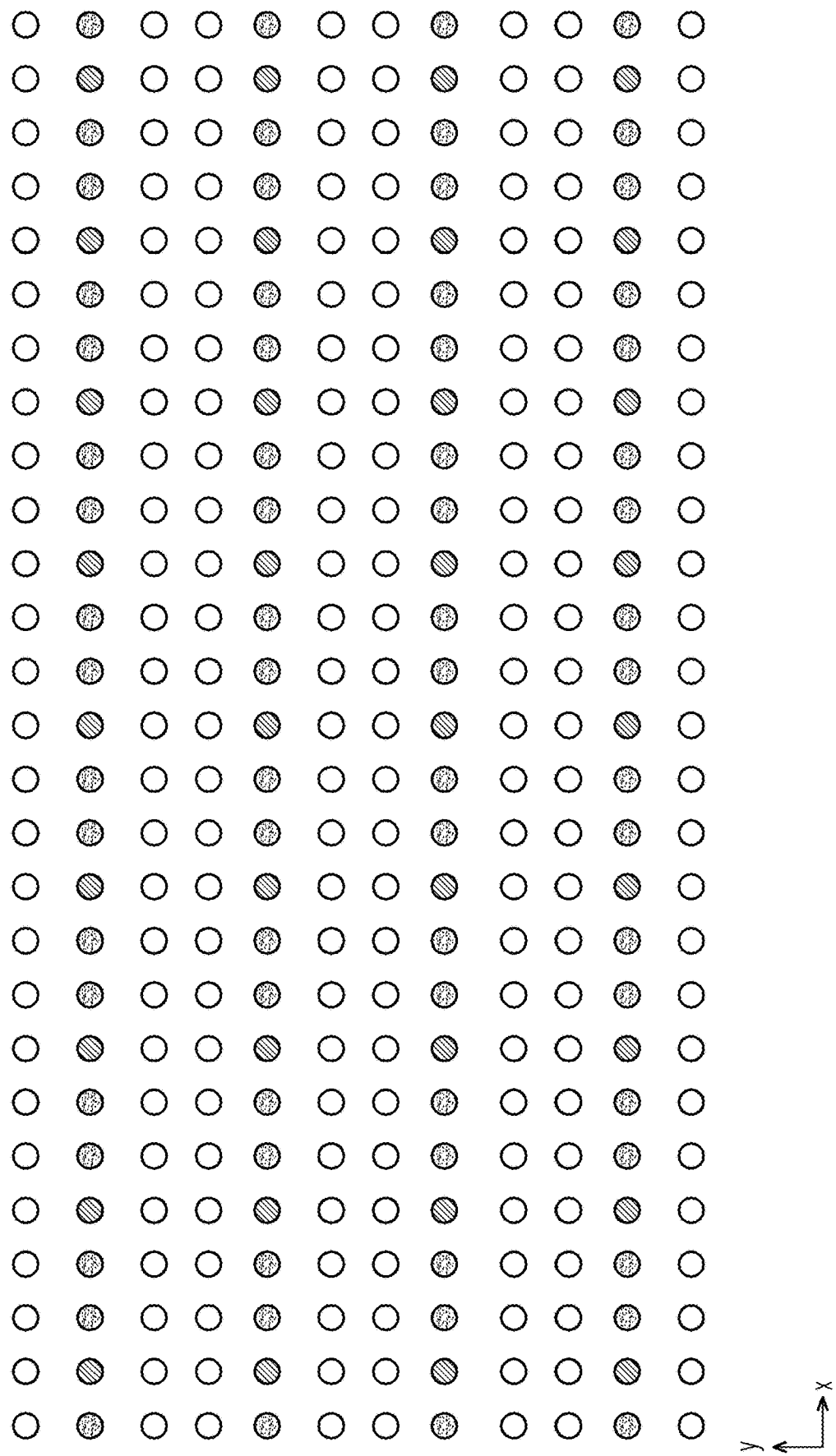
FIG. 13B is a light pattern provided by the tunable illuminator in FIG. 10 when the two geometric phase liquid crystal elements are in the first and first states, respectively.

FIG. 12 is a tunable illuminator when two geometric phase liquid crystal elements are in the first and first states, respectively, according to another embodiment of the invention. FIG. 13A is a light pattern provided by the tunable illuminator in FIG. 12 when the two geometric phase liquid crystal elements are in the second and first states, respectively, and FIG. 13B is a light pattern provided by the tunable illuminator in FIG. 10 when the two geometric phase liquid crystal elements are in the first and first states, respectively. Referring to FIG. 12, FIG. 13A, and FIG. 13B, the tunable illuminator 300c in this embodiment is similar to the tunable illuminator 300b in FIG. 10, and the main difference therebetween is as follows. In this embodiment, the tunable illuminator 300c includes two geometric phase liquid crystal elements 320b and 320c and a quarter-wave plate 350. The geometric phase liquid crystal element 320c is similar to the geometric phase liquid crystal element 320b, wherein the periodical direction of the geometric phase liquid crystal element 320b is along the x direction, and the periodical direction of the geometric phase liquid crystal element 320c is along the y direction.

After the randomly polarized illumination beam 302 is converted by the geometric phase liquid crystal element 320b into left-handed and right-handed circularly polarized first positive and negative order diffraction beams 304 and 305 and a randomly polarized zero order diffraction beam 306, the quarter-wave plate 350 converts the left-handed and right-handed circularly polarized first positive and negative order diffraction beams 304 and 305 into linearly polarized first positive and negative order diffraction beams 304 and 305, and the randomly polarized zero order diffraction beam 306 passes through the quarter-wave plate 350 and is still randomly polarized. Afterwards, the geometric phase liquid crystal element 320c converts each of the linearly polarized first positive and negative order diffraction beams 304 and 305 and the randomly polarized zero order diffraction beam 306 into left-handed and right-handed circularly polarized first positive and negative order diffraction beams and a randomly polarized zero order diffraction beam.

When the geometric phase liquid crystal element 320b is in the second state and the geometric phase liquid crystal element 320c is in the second state, the light pattern on the object 50 provided by the tunable illuminator 300c is as shown in FIG. 11A. When the geometric phase liquid crystal element 320b is in the first state and the geometric phase liquid crystal element 320c is in the second state, the light pattern on the object 50 provided by the tunable illuminator 300c is as shown in FIG. 11B; that is, light dots are tripled along the x direction. When the geometric phase liquid crystal element 320b is in the second state and the geometric phase liquid crystal element 320c is in the first state, the light pattern on the object 50 provided by the tunable illuminator 300c is as shown in FIG. 13A; that is, light dots are tripled along the y direction. When the geometric phase liquid crystal element 320b is in the first state and the geometric phase liquid crystal element 320c is in the first state, the light pattern on the object 50 provided by the tunable illuminator 300c is as shown in FIG. 13B; that is, light dots are tripled along the x direction and tripled along the y direction.

Figure 14A:
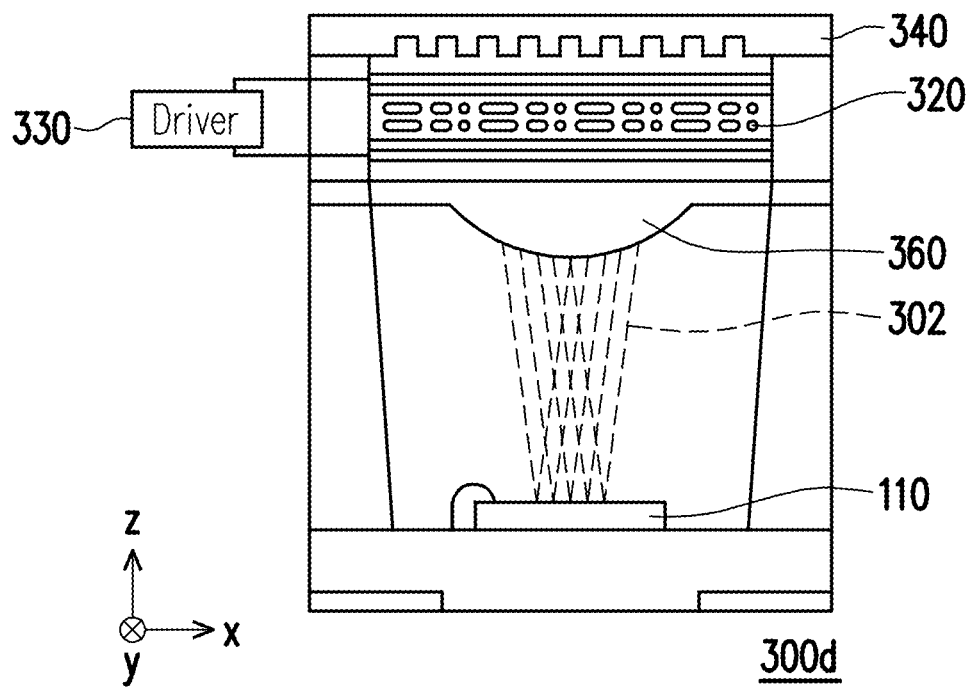
FIG. 14A is a schematic cross-sectional view of a tunable illuminator according to another embodiment of the invention.

FIG. 14A is a schematic cross-sectional view of a tunable illuminator according to another embodiment of the invention. Referring to FIG. 14A, the tunable illuminator 300d in this embodiment is similar to the tunable illuminator 300 in FIG. 2A, and the main difference is as follows. In this embodiment, the tunable illuminator 300d further includes a lens 360 disposed on the path of the illumination beam 302. The lens 360 may be a collimating lens configured to collimate the illumination beam 302. In this embodiment, the lens 360 is disposed between the light source 310 and the geometric phase liquid crystal element 320, and the geometric phase liquid crystal element 320 is disposed between the lens 360 and the diffractive optical element 340.

Figure 14B:
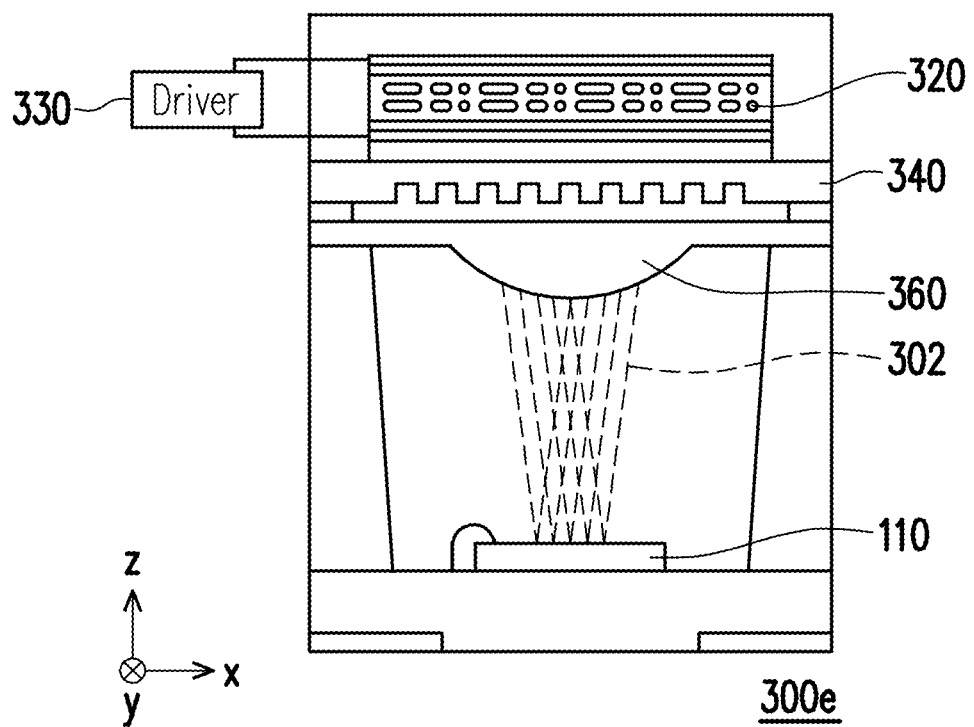
FIG. 14B is a schematic cross-sectional view of a tunable illuminator according to another embodiment of the invention.

FIG. 14B is a schematic cross-sectional view of a tunable illuminator according to another embodiment of the invention. Referring to FIG. 14B, the tunable illuminator 300e in this embodiment is similar to the tunable illuminator 300d in FIG. 14A, and the main difference is as follows. In the tunable illuminator 300e, the diffractive optical element 340 is disposed between the lens 360 and the geometric phase liquid crystal element 320.

Figure 14C:
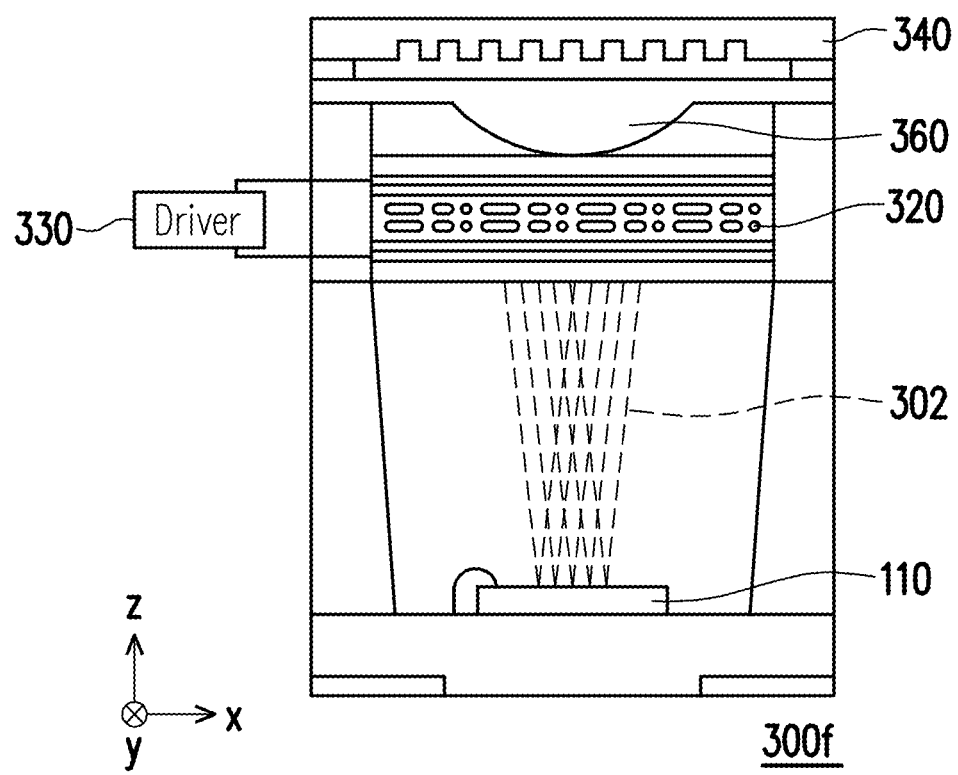
FIG. 14C is a schematic cross-sectional view of a tunable illuminator according to another embodiment of the invention.

FIG. 14C is a schematic cross-sectional view of a tunable illuminator according to another embodiment of the invention. Referring to FIG. 14C, the tunable illuminator 300f in this embodiment is similar to the tunable illuminator 300d in FIG. 14A, and the main difference is as follows. In the tunable illuminator 300f, the lens 360 is disposed between the geometric phase liquid crystal element 320 and the diffractive optical element 340. In other embodiments, the arrangement sequence of the lens 360, the geometric phase liquid crystal element 320, and the diffractive optical element 340 may be any other appropriate sequence.

Figure 15:
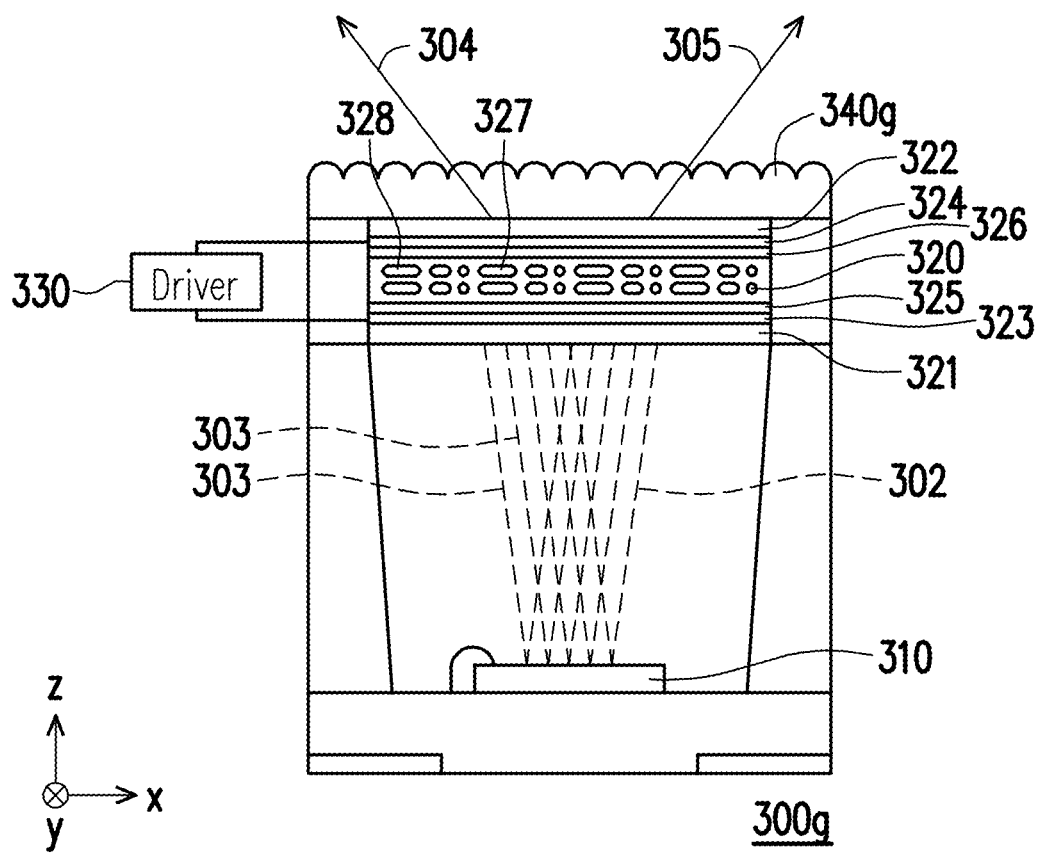
FIG. 15 is a schematic cross-sectional view of a tunable illuminator according to another embodiment of the invention.

FIG. 15 is a schematic cross-sectional view of a tunable illuminator according to another embodiment of the invention. Referring to FIG. 15, the tunable illuminator 300g in this embodiment is similar to the tunable illuminator 300 in FIG. 2A, and the main difference is as follows. In the tunable illuminator 300g, the diffractive optical element 340 in FIG. 2A is replaced by a lens array 340g, and the lens array 340g is also configured to let the illumination beam 302 to be a structured beam. The optical element 340 in each of the aforementioned embodiment may be replaced by the lens array 340g.

In the tunable illuminator according to the embodiment of the invention, since a geometric phase liquid crystal element is disposed on a path of the illumination beam and configured to be switched between a first state and a second state, the field of illumination or the resolution of the illumination beam can be tuned.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:

1. A tunable illuminator comprising:
a light source configured to emit an illumination beam;
at least one geometric phase liquid crystal element disposed on a path of the illumination beam and configured to be switched between a first state and a second state, wherein the first state is closer to a geometric phase than the second state is; and
a driver configured to respectively apply a first voltage difference and a second voltage difference to the geometric phase liquid crystal element, wherein the geometric phase liquid crystal element is switched to the first state in response to the first voltage difference, the geometric phase liquid crystal element is switched to the second state in response to the second voltage difference, and the first voltage difference is less than the second voltage difference,
wherein the tunable illuminator satisfies FOI1>FOI2 or R1>R2, where FOI1 is a field of illumination of the illumination beam formed by the geometric phase liquid crystal element in the first state, FOI2 is a field of illumination of the illumination beam formed by the geometric phase liquid crystal element in the second state, R1 is a resolution of the illumination beam formed by the geometric phase liquid crystal element in the first state, and R2 is a resolution of the illumination beam formed by the geometric phase liquid crystal element in the second state.

2. The tunable illuminator according to claim 1, wherein the first voltage difference is zero.

3. The tunable illuminator according to claim 1, wherein the geometric phase liquid crystal element in the first state is configured to split the illumination beam into a first positive order diffraction beam and a first negative order diffraction beam, and the geometric phase liquid crystal element in the second state is configured to allow the illumination beam to pass through to form a zero order diffraction beam.

4. The tunable illuminator according to claim 1, wherein the geometric phase liquid crystal element in the first state is configured to split a part of the illumination beam into a first positive order diffraction beam and a first negative order diffraction beam, and allow another part of the illumination beam to pass through to form a zero order diffraction beam, and the geometric phase liquid crystal element in the second state is configured to allow the illumination beam to pass through to form a zero order diffraction beam.

5. The tunable illuminator according to claim 1, wherein the geometric phase liquid crystal element is a one-dimensional grating or a one-dimensional prism sheet.

6. The tunable illuminator according to claim 1, wherein the geometric phase liquid crystal element is a two-dimensional grating.

7. The tunable illuminator according to claim 1, wherein the illumination beam is a structured beam.

8. The tunable illuminator according to claim 1, wherein the geometric phase liquid crystal element in the first state is configured to split at least a part of the illumination beam into a first positive order diffraction beam and a first negative order diffraction beam, one of the first positive order diffraction beam and the first negative order diffraction beam is a left-handed circularly polarized beam, and the other of the first positive order diffraction beam and the first negative order diffraction beam is a right-handed circularly polarized beam.

9. The tunable illuminator according to claim 1, wherein the at least one geometric phase liquid crystal element comprises two geometric phase liquid crystal elements having different periodical directions and stacked on the path of the illumination beam.

10. The tunable illuminator according to claim 9 further comprising a quarter-wave plate disposed on the path of the illumination beam and between the two geometric phase liquid crystal elements.

11. The tunable illuminator according to claim 1, wherein the light source is a vertical cavity surface emitting laser.

12. The tunable illuminator according to claim 1 further comprising a diffractive optical element disposed on the path of the illumination beam.

13. The tunable illuminator according to claim 1 further comprising a lens disposed on the path of the illumination beam.

14. The tunable illuminator according to claim 1 further comprising a lens array disposed on the path of the illumination beam.

\* \* \* \* \*